Nov. 18, 1952   P. DUFFING ET AL   2,618,718
HIGH-SPEED ELECTRIC SWITCHING APPARATUS
Filed Oct. 27, 1950   4 Sheets-Sheet 1

Inventors
PAUL DUFFING and
FRIEDRICH GIEFFERS.
BY
ATTORNEY

Nov. 18, 1952 P. DUFFING ET AL 2,618,718
HIGH-SPEED ELECTRIC SWITCHING APPARATUS
Filed Oct. 27, 1950 4 Sheets-Sheet 2

Inventors.
PAUL DUFFING and
FRIEDRICH GIEFFERS.
BY
ATTORNEY

Nov. 18, 1952 P. DUFFING ET AL 2,618,718
HIGH-SPEED ELECTRIC SWITCHING APPARATUS
Filed Oct. 27, 1950 4 Sheets-Sheet 4

Inventors,
PAUL DUFFING and
FRIEDRICH GIEFFERS.
BY
C. M. Amy
ATTORNEY

UNITED STATES PATENT OFFICE 2,618,718

HIGH-SPEED ELECTRIC SWITCHING APPARATUS

Paul Duffing, Berlin-Siemensstadt, and Friedrich Gieffers, Berlin-Spandau, Germany, assignors to Siemens-Schuckertwerke, Aktiengesellschaft, Berlin-Siemensstadt, Germany, a corporation of Germany Application October 27, 1950, Serial No. 192,546
In Germany October 31, 1949

13 Claims. (Cl. 200—93)

Our invention relates to contactors, circuit breakers, relays or the like electric switching apparatus, preferably with reference to the control of power currents.

It is an object of the invention to increase the switching speed of such apparatus for any given mechanical actuating power available for opening or closing the switch contacts or/and to reduce the power requirements needed for securing a given high speed of switching operation accelerated in such switching apparatus when placing the movable switch contact into circuit opening or closing position.

In known electric switches, the movable contact members are accelerated through insulated rods, levers, springs, air pistons, magnets and the like actuating devices. The parts of the actuating device which are connected with the movable switch contact increase the total mass of the movable contact structure far beyond that actually needed for the electric contactor performance. It is therefore a more specific object of the invention to minimize the masses to be accelerated or to make them equal or almost equal to the mass needed for the movable contact member proper.

According to our invention, we design the two coactive contact pieces of an electric switching apparatus as two of the bodies of an impact chain, thus taking advantage of the physical law that an impact can be freely propagated through an elastic impact chain and that, by suitable dimensioning of the individual impact bodies only one of two adjacently located impact bodies can be made to perform an impact-repressive movement. According to the invention, such movement of a selected impact body is utilized for opening or closing the electric circuit to be controlled. Due to the impact, the momentum of the driving impact body is transmitted to the driven body within a period of time in the order of micro seconds, and the driven body, if properly dimensioned, leaves its previous position with a velocity corresponding to the kinetic energy of the impact. Since the mass of the switch contact pieces need not be made larger than is necessary for their current carrying duty, relatively small impact energies suffice to effect a substantially instantaneous opening or closing of the contacts. The driven body is accelerated only within the short impact or collision interval i. e., as mentioned, within a period in the order of micro seconds. The accelerating force is limited only by the strength of the contact material, as compared with conventional switches in which this limit is determined by the strength of the accelerating parts of the drive mechanism. Due to the large mass of the driving mechanism part, the acceleration in conventional switches is considerably smaller for a given accelerating force than in switches according to the invention where such additional masses do not participate in the acceleration of the contact pieces proper.

Preferably, the mass of the individual bodies of the impact chain is dimensioned, in accordance with the physical laws of impact, so that the impact energy of each driving body is almost or completely transferred to the driven body.

According to another feature of the invention, the contact pieces which effect the metallic closing of the electric current to be controlled and which separate from each other for interrupting the circuit are also designed as structural parts of an arc box or other arc quenching device. For instance, in order to quench the arc, the contact pieces which form two of the bodies of the above mentioned impact chain may be disposed within magnetic blow-out fields, or these contact pieces may be designed as parts of nozzles for the supply of arc quenching air or gas under pressure. In accordance with a preferred embodiment of the invention the contact pieces are disposed in vacuum so that an exceedingly small separation travel is sufficient for a high blocking voltage.

In order to secure the necessary contact pressure, it is as a rule necessary to provide means, such as springs, for pressing the movable contact piece against the stationary contact piece when the switch is closed. The same means may also serve to arrest the movable contact piece in its circuit opening position. To this end, toggle springs may be provided, for instance. Especially suitable are toggle or dead-center mechanisms as much as possible free of friction. For instance, mechanisms composed of pull-strained springs and of rigid parts subjected to compressive strain.

The supply of current to the contact pieces may be effected by designing these pieces as slide contacts so that the current passes through the frictional engagement. According to another feature of the invention, the current is supplied through conductive membranes or diaphragms which are joined with the impact body or which are themselves designed as an impact body. Such a diaphragm can be given a large degree of stiffness as long as it is yielding by at least one order of magnitude compared with the elastic deformation of two adjacent impact bodies during impact. When dimensioning the contact pieces it is to be considered that the diaphragm increases the mass affected by the impact.

With such diaphragms, it is readily possible to evacuate the space between the two impact bodies that form the contact pieces proper. The ambient air pressure may then affect the position or deformation of the diaphragm, especially of the less rigid diaphragm joined with the movable contact piece. This can be utilized by securing the desired contact pressure as a result of the ambient air pressure. If desired, however, the effect of the ambient pressure can be eliminated by sealing the movable contact piece with its diaphragm against the ambient air with the aid of an additional diaphragm member. Such an additional diaphragm, which may also form or carry an impact body, is dimensioned to safely withstand ambient pressure. The protective space between the additional diaphragm member and the adjacent diaphragm may also be evacuated, but the vacuum in the just-mentioned protective space need not be as high as in the vacuum space between the two diaphragms which carry the contact pieces. The pressure in the protective space may be chosen so that it is just sufficient to provide the desired contact pressure.

If the current to be interrupted is alternating, the switching moment is preferably so timed that the switching occurs at or near the current zero passage. In power lines where high short-circuit currents are to be expected, two vacuum switches of the above mentioned impact-chain type are preferably series connected and so adapted that one of them opens upon occurrence of a short-circuit when the current exceeds a given instantaneous magnitude and operates within a small period of time compared with the developing period of the short-circuit current. This switch then inserts a resistor into the circuit and thus limits the short-circuit current already during its nascent period. The other switch is opened subsequentially at a following zero passage of the current to fully interrupt the circuit. Such a design of the switching apparatus prevents the occurrence of excessively high short-circuit currents.

The foregoing and other objects and features of the invention will be apparent from the following description of the embodiments exemplified by the drawing in which.

Figure 1:
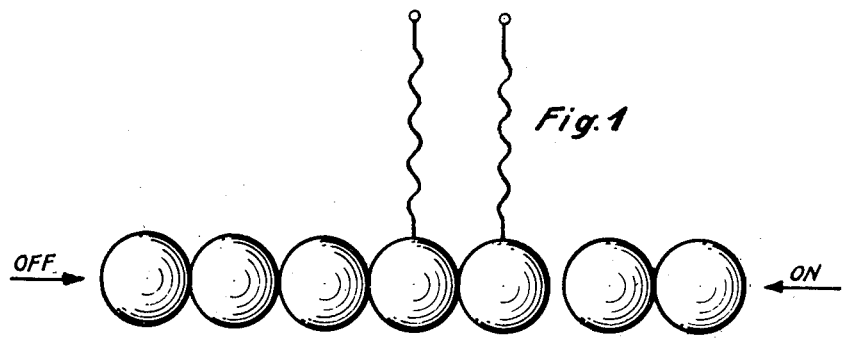
Fig. 1 is explanatory and represents the principle of an impact chain for switching apparatus according to the invention.

The principle utilized by the invention will be understood from Fig. 1. A number of elastically rigid spheres are arranged in a row so that their centers lie on a straight line. If the impact is imparted to a sphere at the end of the row, the impact is propagated from body to body through the entire chain. The fourth and fifth bodies of the chain, counted from the left, serve as the contact members of an electric switch, this being indicated by showing these two bodies connected with respective current supply leads. A gap exists only between the fifth and sixth bodies. If a switching-out impact is applied from the left, and assuming that all bodies have the same mass and elasticity, the impact travels from body to body without the first four bodies moving from their original positions. Since the fifth body is not contacted by the sixth, the impact throws the fifth body toward the right and thus causes it to open the electric current. At the end of its limited travel the fifth body collides with the sixth body and passes its kinetic energy to the sixth and any subsequent impact body.

The just mentioned performance is predicated upon the condition that the masses of the spheres as well as their materials are all equal. If the two bodies which form the contact pieces proper are wholly or partly made of electric contact material such as copper or silver, then it is preferable to design all other bodies substantially in the same manner. If this is not feasible, then it is preferable to take care that during the circuit-interrupting performance each subsequent impact is softer than the preceding one. This can be achieved by varying the shape of the impact bodies, for instance, by using instead of a sphere an elongated cylinder of the same mass. Then of course, the transmission of the impact in the reverse direction, i. e. during the switching-in performance is no longer equally ideal; but this is insignificant because sufficient energy for covering the losses can readily be provided for the switching-in operation, while it is generally essential to secure a maximum effect with a minimum of energy when interrupting the circuit.

Figure 2:
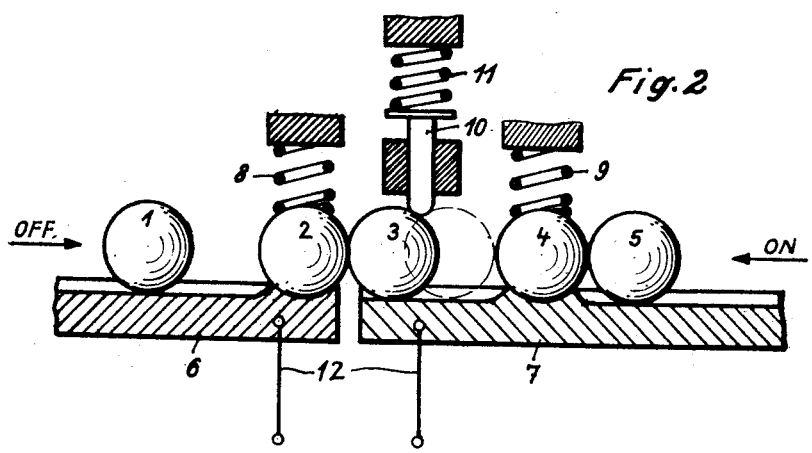
Fig. 2 shows schematically a longitudinal sectional view of an impulse-chain switching apparatus according to the invention with appertaining spring biasing means.

Turning now to the embodiment of Fig. 2, it will be shown that it is readily possible to secure a desired contact pressure and to also arrest the movable contact piece in its circuit operation position. In Fig. 2 the sphere or ball receiving the switching-out impact is denoted by 1. Normally spaced from this ball is an impact body 2, also ball shaped, which functions as the stationary contact member of the switch and is shown in contact engagement with a similarly designed, movable contact member 3. Next following is a ball 4 which limits the interrupting travel of the movable contact member 3. Ball 4 is contacted by an end ball 5 which serves to receive the switching-in impact. All balls are guided and supported by mutually insulated contact rails 6 and 7. Balls 1, 3 and 5 are movable in respective grooves and balls 2 and 4 are biased by respective springs 8 and 9 into depression of the rails. Contact pressure is imparted to ball 3 by a vertically guided pin 10 biased by a helical compression spring 11. Pin 10 forces the contact ball 3 against the stationary ball 2 when ball 3 is in the illustrated closing position. The contact opening position of ball 3 is shown by a broken line. It will be recognized that when ball 3 is in the latter position, pin 10 and spring 11 take care of arresting it by forcing it against ball 4. The two grooved rails 6 and 7 consist of metal and are connected with the leads 12 of the circuit to be controlled. The force of springs 8, 9, and 11 is small in comparison with the force of the actuating impacts.

Figure 3:
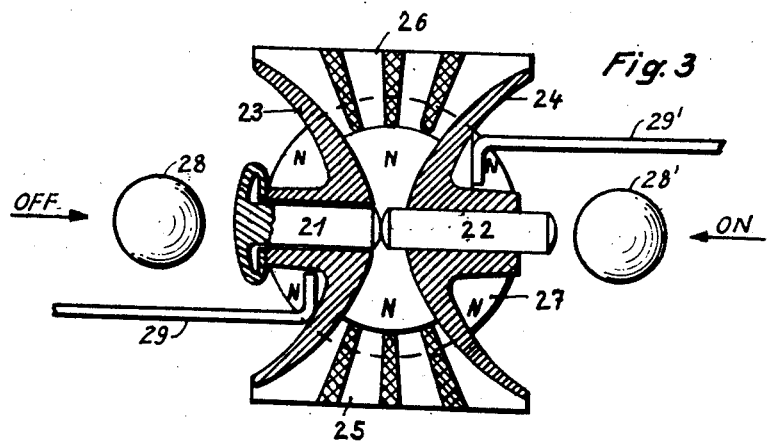
Fig. 3 shows schematically and in section another embodiment in which the contact pieces of the switching apparatus form part of an arc box.

In the embodiment of Fig. 3, the contact pieces of the impact chain form part of an arc quenching device. The two contact pieces, denoted by 21 and 22, are substantially cylindrical. The stationary contact piece 21 is conductively and elastically connected with an arc horn 23, the elasticity being chosen so that the mass of the arc horn is separated from the mass of the contact piece as far as the impact transmission is concerned. The movable contact piece 22 is slidable in a bore of an arc horn 24. The slidable contact engagement serves to pass current from the arc horn to the contact piece. The device for providing contact pressure and for securing the movable contact piece in the circuit-opening position, as well as the means for applying the actuating impacts are not shown in this figure. Two bodies 24 and 26 of insulating material form the arc chambers and arc grids. These bodies sub-divide the arc occurring during the opening performance of the switch. A blow-out field is provided by means of a permanent magnet 27 which may be replaced by magnet coils if desired. The impact bodies for receiving the actuating blows are denoted by 28 and 28'. Current is supplied through leads 29 and 29' connected with the arc horns 23 and 24 respectively.

Figure 4:
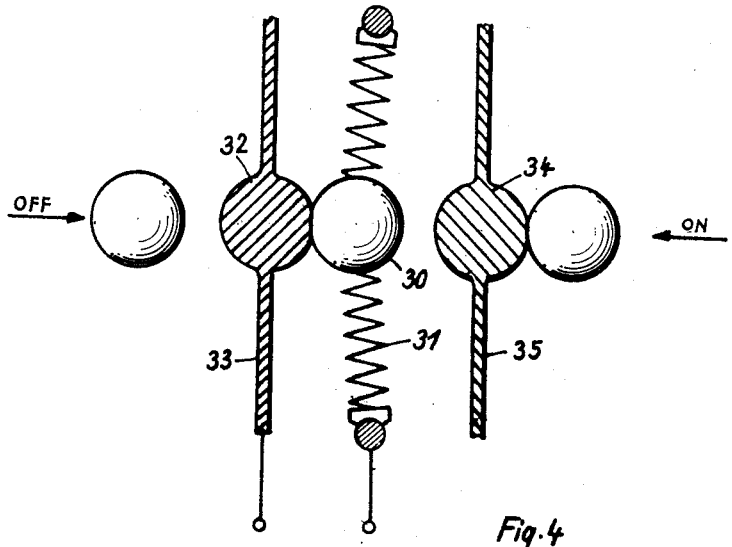
Fig. 4 shows schematically a part-sectional view of an embodiment equipped with current conductive diaphragm and a toggle spring mechanism for providing contact pressure.

In the embodiment represented in Fig. 4, the movable contact piece 30 is held in position and biased by a toggle spring 31 which also conducts the electric current to the contact piece. The stationary contact piece 32 forms part of a diaphragm 33 which holds the contact piece 32 in proper position and also serves to supply current. An impact body 34 is held in position by a diaphragm 35 and serves for limiting the opening movement of the movable contact piece 30. The diaphragms 33 and 35 have considerable rigidity, it being only necessary to keep their elasticity larger by one order of magnitude than the mutual elasticity of the impact bodies during impact or collision.

The contact surface of each contact piece also transmits the impact. To prevent elastic deformation during impact and the loss in energy caused by such deformation, the contact areas are made so large that the impact strain remains below the elastic limit of the material. For that reason the contact pieces are preferably flattened at their contact area. In order to bring the movable piece from one to the other end position, the toggle spring must be flexed. This requires a certain expenditure of work which should be kept as small as possible. Hence, the toggle spring mechanism should be given a design as friction-free as possible. Since the opening travel has a given magnitude and since the work required for flexing the spring depends upon the opening travel and the contact pressure, the spring is preferably asymmetrically arranged so that the switching-out impact can be kept small. The switching-in impact will then be correspondingly larger, but as mentioned, sufficient energy is usually available for this operation.

Figure 5:
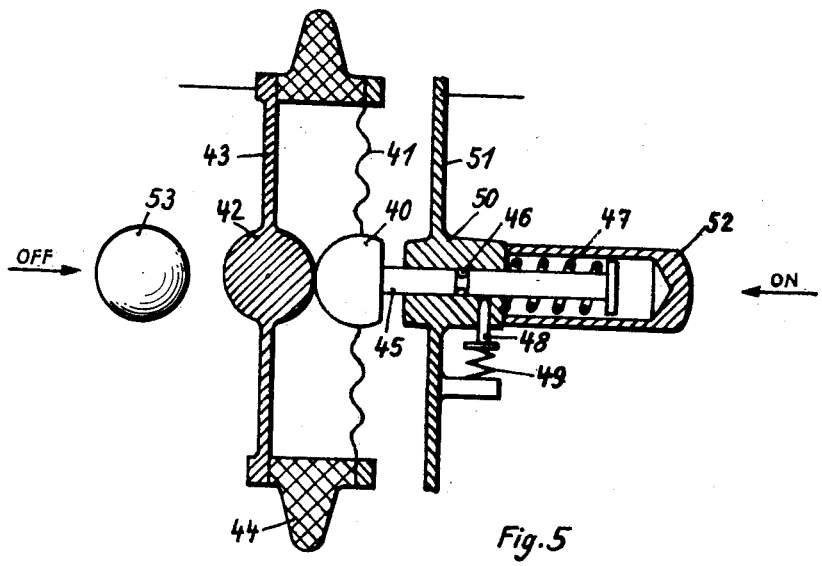
Fig. 5 is a schematically sectional view of a vacuum switch.

In the apparatus according to Fig. 5, the contact pieces of the switch operate in vacuum. The movable contact piece 40 is secured to a relatively soft diaphragm 41 and hence capable of movement. The stationary contact piece 42 forms an integral part of a relatively rigid diaphragm 43. Both diaphragms are attached to an annular insulating body 44. The enclosure thus formed is evacuated so that the separation of the contact pieces occurs within the vacuum space. The diaphragm 44 is so stiff that the ambient air pressure has no appreciable effect on the position of the contact piece 42. The diaphragm 41 is softer so that the ambient pressure acts in the sense of desired contact pressure. A stationary impact body 50 forms an integral part of a diaphragm member 51 which secures the body 50 in the proper position. For partially eliminating the ambient air pressure, which would otherwise require a correspondingly larger actuating impact energy, the contact piece 40 has a cylindrical extention 45 biased by a helical compression spring 47. The extension 45 has a recess 46 into which catches a latch pin 48 biased by a spring 49 when contact piece 40 is its circuit-opening position. The impact body to receive a blow from the switching-in actuating means is denoted by 52. The corresponding impact body for receiving the switching-out impact is designated by 53.

Figure 6:
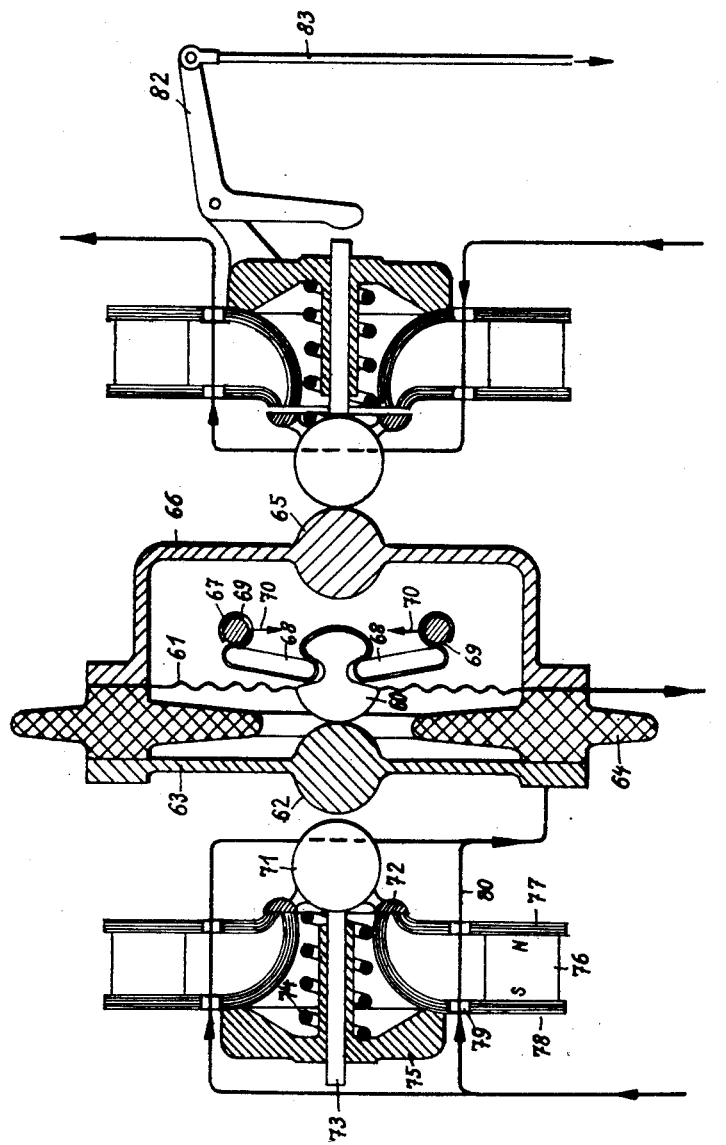
Fig. 6 shows an axial section through another embodiment of a vacuum switch in conjunction with appertaining actuating means.
Figure 7:
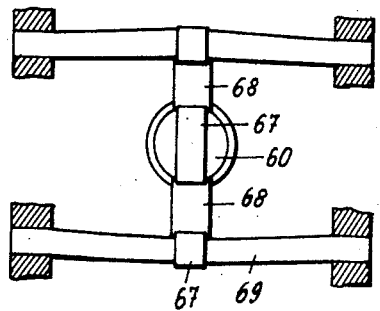
Fig. 7 is a schematic front view of some of the parts appertaining to the apparatus of Fig. 6 seen from the right and side of Fig. 6.
Figure 8:
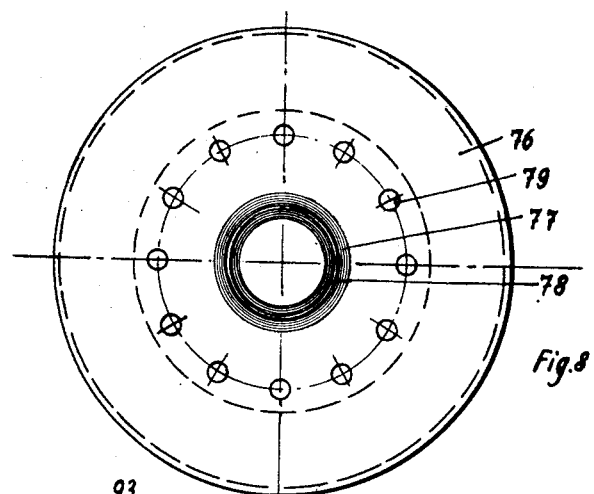
Fig. 8 is a view on other parts of the device of Fig. 6 seen from the left side of Fig. 6.

The switching apparatus according to Figs. 6, 7 and 8 has its contact pieces disposed in vacuum and is equipped with means for eliminating the effect of ambient air pressure on the movable contact piece by means of an evacuated protective space. The movable contact piece 60 of this apparatus is vacuum-tightly secured to a soft diaphragm 61. The stationary contact piece 62 forms an integral part of a diaphragm 63 of sufficient rigidity to prevent ambient air pressure from appreciably affecting the position of contact piece 62. The two diaphragms 61 and 63 form together with an annular insulating body 64 an enclosed and sealed chamber which is highly evacuated. The impact body 65 with an appertaining and preferable integral diaphragm member 66 covers the movable contact piece 60 with its diaphragm 61 against the ambient air pressure, thus providing between members 66 and diaphragm 61 a protective space which is also evacuated, it being not necessary, however, to drive the vacuum of this space as high as that of the switching chamber. Due to the stiffness of the diaphragm member 66, the position of the impact body 65 is not changed by ambient air pressure.

Disposed in the protective space is a toggle joint mechanism which provides contact pressure and also holds the movable contact piece in its circuit-opening position. The toggle joint mechanism comprises a spring steel band 67 and two pressure resistant links 68 of small mass which enter into recesses of the movable contact piece 60. The ends of the spring band 67 are attached to two respective spring rods 69 whose ends are firmly secured to the housing structure. The spring band 67 extends around the ends and one side of each link 68 and also around the right-hand end of contact piece 60 (Fig. 6). The spring rods 69 exert compressive forces in the direction of the arrows 70 (Fig. 6). These forces are transmitted through the spring band 67 and the rigid links 68 to the contact piece 60. The places of contact engagement of the links 68 with the spring rods 69 and the contact piece 60, together with the spring band 67, form friction-free pivot joints. The spring band is preferably dimensioned to be stressed nearly up to the limit of its strength.

In the embodiment according to Fig. 6, the switching-out impact is produced by means of a control device which has an annular permanent magnet 76 with two disc-shaped and laminated pole shoes 77 and 78. The annular gap between the two pole shoes is bridged by an armature 72 which is rigidly joined with a ball 71 to form an impact body. This design is chosen to keep the mass of the armature as small as possible. Acting on the ball 71 is a spring 74 which operates as an energy storing device for producing the impact. The magnetic flux of the magnet, whose flux path extends through the armature, seals the impact body in the illustrated position, in opposition to the force of spring 74. For releasing the impact, the armature holding flux must be eliminated. To this end, the pole shoes 77 and 78 have holes 79. The leads of the circuit which is to control the actuating device pass through the holes 79. In the illustrated example, these leads appertain to the circuit to be controlled by the impact-chain switching apparatus operates as an overload release. When the current exceeds a pre-determined limit, the pole shoes become magnetized in the vicinity of the holes 79 so that the holding flux is separated from the armature. As a result, the armature is forced away from the magnet by the spring 74 and the ball 71 is propelled by the stored spring energy. After passing through a small path of travel, ball 71 collides with the stationary contact piece 62 which, in turn, throws the contact piece 60 to its open position. A release pin 73 engageable with ball 71 is provided to permit releasing the switch by hand.

The switching-in impact is produced in a similar manner by the actuating device shown in the right-hand portion of Fig. 6. The design of this device is similar to that of the above-described switching-out control means so that it need not be described in detail. However, the switching-in control device is shown to be equipped with means for releasing the armature from the holding magnet at will. An angular lever 82 is pivoted on the stationary structure of the device and is linked with an insulating rod 83. When rod 83 is pulled, an additional force is exerted on the armature of such a magnitude that the armature can no longer be retained by the magnet and is expelled by the force of the spring. If armature is to be released electrically, a blocking current is passed through a circuit that extends through the pole shoe openings. The release current may be supplied from any suitable source.

In order to minimize the considerable arc losses and the danger of excessive voltages, it is preferable to have switching apparatus according to the invention released at or near current zero passages. For this purpose, the release winding of the magnet can be excited by an impulse occurring shortly before a current zero passage and having such a magnitude that the holding flux is blocked away from the armature. This impulse can be taken, for instance, from a saturable transformer whose primary is traversed by the current to be controlled by the switching apparatus.

Excessive short-circuit currents can be fully avoided by connecting two vacuum switches of the above-described design in series with each other and connecting a current limiting resistor in shunt relation to the first operating switch. This first switch is instantly released when the increasing overload current exceeds a predetermined critical value. Then the shunt resistor is inserted into the circuit, and the magnitude of the short-circuit current is limited already in its incipient stage. The second switch opens at a subsequent zero passage thus finally interrupting the load circuit.

Figure 9:
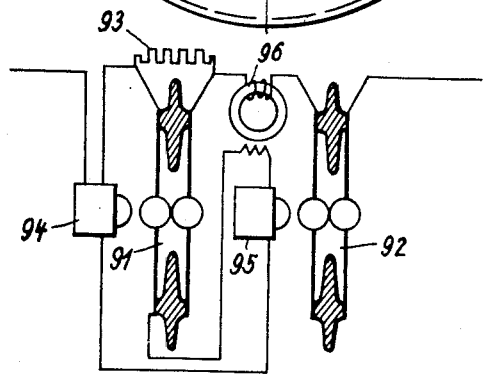
Fig. 9 shows schematically an embodiment of the invention composed of two inter-connected and coactive impact-chain units according to the invention.

Figure 9 exemplifies an embodiment of the just mentioned kind. The two series-connected vacuum switches are denoted by 91 and 92 respectively. Each switch may be designed exactly like the switching apparatus shown in Figures 6, 7 and 8. The switching period of such switches, i. e., the time elapsing from the start to the end of a contact movement, is sufficiently small in comparison with a half wave period of the current to be interrupted. Parallel connected to switch 91 is a resistor 93. Switch 91 is released by an overload-responsive actuating device 94 which may be designed in accordance with the actuating devices shown in Figures 6, 7 and 8. The switch 92 receives its switching-out signal from a zero-current responsive device 94 also designed in accordance with Figs. 6 to 8 but whose magnet control winding is excited by an impulse supplied from a saturated transformer 96. As soon as the overload current exceeds a given instantaneous value, switch 91 opens immediately while closing the circuit of the secondary winding of transformer 96 so that switch 92 is released at a subsequent current zero passage. Consequently, the overload-limiting resistor 93 is under load only during very short periods of time and can be given a corresponding rating. The devices for switching in and for providing contact pressure are not illustrated in Fig. 9. They may also be designed in accordance with the corresponding features of the embodiments referred to previously.

The above-described embodiments of the invention will suffice to illustrate that the invention can be embodied in different apparatus of greatly diversified designs, and it will be understood by those skilled in the art upon a study of this disclosure that the invention permits many variations and modifications other than those specifically mentioned, without departure from the objects and essential features of the invention and within the scope of the claims annexed hereto.

We claim:

1. An electric circuit breaker for power circuits, comprising two terminals for connection to a power circuit to be controlled, an impact chain of aligned and individually movable impact bodies, two successive ones of said bodies being connected with said respective terminals and having a circuit-opening position in which said two bodies are spaced from each other and a circuit-closing position in which said two bodies are in electric contact engagement with each other, and arc suppressing means defining a chamber and being joined with said two bodies, said two bodies having their respective mutually engageable portions disposed in said chamber, the rest of the impact bodies of said chain being disposed outside said chamber.

2. In a circuit breaker according to claim 1, one of said two circuit-controlling bodies having a circuit closing position and a circuit opening position relative to said other circuit-controlling body, and force transmitting means engageable with said one body in each of said positions to apply contact pressure in said closing position and arresting said one body in said opening position respectively.

3. A circuit breaker according to claim 1, comprising two conductive elastic diaphragm means electrically connecting said terminals with said respective two circuit-controlling bodies to supply electric current thereto.

4. A circuit breaker according to claim 1, comprising an electrically conductive and elastically deformable diaphragm, one of said circuit-controlling bodies being mounted on said diaphragm.

5. A circuit breaker according to claim 1, comprising an electrically conductive and elastically deformable diaphragm, one of said circuit-controlling bodies and said diaphragm being integral thus forming with each other a single structural part.

6. In a circuit breaker according to claim 1, said arc suppressing means comprising an evacuated enclosure having two elastically deformable and electrically conductive wall portions electrically insulated from each other, said two circuit-controlling bodies being disposed within said enclosure and being electrically and mechanically joined with said respective wall portions.

7. An electric circuit breaker for power circuits, comprising two terminals for connection to a power circuit to be controlled, an impact chain of aligned and individually movable impact bodies, two successive ones of said bodies being connected with said respective terminals, one of said two bodies having relative to the other a circuit-opening position in which said two bodies are spaced from each other in the chain alignment direction and a circuit-closing position in which said two bodies are in contact engagement with each other, contact-pressure spring means engageable with said one body in each of said positions and having at said one body a force component perpendicular to said direction for securing said one body in said respective positions, and two alternately operable impact drives disposed at the respective ends of said chain for driving said one body from either of said positions to the other.

8. In circuit breaker according to claim 7, said spring means comprising a toggle joint mechanism composed of rigid parts and pull-tensioned leaf spring means and connected with said one body in each of said positions to apply contact pressure in said closing position and arresting said one body in said opening position respectively.

9. Electric switching apparatus, comprising an evacuated enclosure having two conductive diaphragms insulated from each other, two contact bodies mounted on said respective diaphragms and being movable relative to each other between a circuit-opening position in which said bodies are spaced from each other and a circuit-closing position in which said two bodies are in contact engagement with each other, an impact chain of aligned and individually movable impact bodies, two of said impact bodies consisting of said respective two contact bodies, said other impact bodies being disposed outside said enclosure.

10. Electric switching apparatus, comprising an impact chain of elastically rigid bodies having aligned centers of gravity and being individually movable along their alignment direction, two immediately successive ones of said bodies being electrically insulated from each other and mutually electrically engageable, an enclosure having two substantially parallel diaphragm walls of conductive material insulated from each other and having a sealed space between said diaphragm walls, one of said diaphragm walls being more rigid than the other, said two latter bodies of said impact chain being disposed within said enclosure space and being joined with said respective diaphragm walls.

11. Apparatus according to claim 10, comprising biasing means disposed within said enclosure and engageable with the one body joined with said less rigid diaphragm wall for applying contact pressure and holding force to said latter body.

12. Electric switching apparatus, comprising an impact chain of elastically rigid bodies having aligned centers of gravity and being individually movable along their alignment direction, two immediately successive ones of said bodies being electrically insulated from each other and mutually electrically engageable, an enclosure having two conductive and mutually insulated elastic diaphragm walls, said two latter bodies being disposed within said enclosure and being mechanically and electrically connected with said respective diaphragm walls, a first one of said diaphragm walls being more rigid than the second diaphragm wall and resistant to ambient air pressure, a diaphragm member joined with said enclosure and covering said second diaphragm, against the ambient air, said diaphragm member being resistant to ambient air pressure, and an evacuated space between said member and said second diaphragm wall.

13. Electric switching apparatus, comprising an impact chain of aligned and individually movable bodies, two immediately successive ones of said bodies being electrically conductive and mutually engageable for electric circuit control, a magnet armature engageable with an end body of said chain to impart an actuating impulse thereto, a spring joined with said armature and having a force directed to produce said impulse, magnet means forming a magnetic flux path with said armature to normally hold said armature in an inactive position against the force of said spring, said magnet means having an electric control winding for substantially eliminating the flux in said path.

PAUL DUFFING.
FRIEDRICH GIEFFERS.

REFERENCES CITED

The following references are of record in the file of this patent:

UNITED STATES PATENTS

| Number | Name | Date |
|---|---|---|
| 1,287,233 | Chubb | Dec. 10, 1918 |
| 2,261,686 | Kesselring | Nov. 4, 1941 |
| 2,292,489 | Stibitz | Aug. 11, 1942 |
| 2,307,868 | Stibitz | Jan. 12, 1943 |